United States Patent
Yang et al.

(10) Patent No.: US 9,960,873 B2
(45) Date of Patent: May 1, 2018

(54) TIME SYNCHRONOUS PLUGGABLE TRANSCEIVER

(71) Applicant: Telefonaktiebolaget L M Ericsson (publ), Stockholm (SE)

(72) Inventors: Qingfeng Yang, Montreal (CA); Francesco Pasio, Genoa (IT); Zhendong Lei, Beijing (CN); Stefano Ruffini, Rome (IT)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 43 days.

(21) Appl. No.: 14/768,356

(22) PCT Filed: Feb. 22, 2013

(86) PCT No.: PCT/CN2013/071758
§ 371 (c)(1),
(2) Date: Aug. 17, 2015

(87) PCT Pub. No.: WO2014/127519
PCT Pub. Date: Aug. 28, 2014

(65) Prior Publication Data
US 2015/0381299 A1    Dec. 31, 2015

(51) Int. Cl.
*H04J 3/06* (2006.01)
*H04L 7/00* (2006.01)
*H04L 7/033* (2006.01)

(52) U.S. Cl.
CPC .......... *H04J 3/0697* (2013.01); *H04L 7/0087* (2013.01); *H04L 7/0331* (2013.01); *H04J 3/0667* (2013.01)

(58) Field of Classification Search
None
See application file for complete search history.

(56) References Cited

U.S. PATENT DOCUMENTS 7,613,212 B1 * 11/2009 Raz ................. H04J 3/0641
                                              370/510
8,718,482 B1 *  5/2014 Roberts ............ H04B 10/27
                                              398/102

(Continued)

FOREIGN PATENT DOCUMENTS

CN        1965555 A      5/2007
CN      102213806 A     10/2011

(Continued)

OTHER PUBLICATIONS

International Search Report for International application No. PCT/CN2013/071758, dated Nov. 21, 2013.

(Continued)

*Primary Examiner* — Faruk Hamza
*Assistant Examiner* — Cassandra Decker
(74) *Attorney, Agent, or Firm* — Baker Botts, LLP

(57) ABSTRACT

A pluggable transceiver module (200) comprising a line receiver (208) connected to a unit interface transmitter (202), a line transmitter (206) connected to a unit interface receiver (204) and a timestamp counter (210) adapted to generate counter values based on clock signals received from an external source and to send the counter values to the line transmitter (206) and to the line receiver (208). The line transmitter (206) and the line receiver (208) are adapted to associate timing packets in a stream of data packets transmitted and received by the pluggable transceiver module (200) with counter values output by the timestamp counter (210).

15 Claims, 15 Drawing Sheets

(56) References Cited

U.S. PATENT DOCUMENTS

| | | | |
|---|---|---|---|
| 2004/0010729 A1* | 1/2004 | Lockridge | H04J 3/0632 713/500 |
| 2006/0280182 A1* | 12/2006 | Williams | H04J 3/0632 370/394 |
| 2008/0025344 A1 | 1/2008 | Biederman et al. | |
| 2010/0098433 A1* | 4/2010 | Boyd | H04J 3/0658 398/155 |
| 2010/0100759 A1* | 4/2010 | Blixt | G06F 1/14 713/502 |
| 2010/0183035 A1* | 7/2010 | Li | H04L 43/106 370/503 |
| 2011/0051754 A1* | 3/2011 | Lansdowne | H04J 3/0673 370/503 |
| 2011/0200051 A1* | 8/2011 | Rivaud | H04J 3/0641 370/400 |
| 2011/0286560 A1* | 11/2011 | Pignatelli | H04J 3/0655 375/356 |
| 2012/0128369 A1 | 5/2012 | Hann | |
| 2012/0275501 A1* | 11/2012 | Rotenstein | H04J 3/0667 375/220 |
| 2013/0010813 A1* | 1/2013 | Ruffini | H04J 3/0697 370/503 |
| 2013/0077968 A1* | 3/2013 | Yang | H04B 10/40 398/45 |
| 2013/0121347 A1* | 5/2013 | Saito | H04J 3/0697 370/474 |
| 2013/0308658 A1* | 11/2013 | Le Pallec | H04J 3/0697 370/503 |

FOREIGN PATENT DOCUMENTS

| | | |
|---|---|---|
| CN | 102511132 A | 6/2012 |
| WO | WO 2011/123635 A2 | 10/2011 |

OTHER PUBLICATIONS

SFF-8431 Specifications for Enhanced Small Form Factor Pluggable Module SFP+; Revision 4.1, Jul. 6, 2009.

IEEE Standard for a Precision Clock Synchronization Protocol for Networked Measurement and Control Systems; IEEE Instrumentation and Measurement Society, sponsored by the Technical Committee on Sensor Technology (TC-9), Jul. 24, 2008.

Communication Pursuant to Rule 164(1) EPC; Partial Supplementary European Search Report for Application No. / Patent No. 13875527.7-1851 / 2959600 PCT/CN2013071758—dated Jul. 29, 2016.

Chinese Search Report for Application No. 201380075867.7—dated Jul. 26, 2017.

* cited by examiner

US 9,960,873 B2

TIME SYNCHRONOUS PLUGGABLE TRANSCEIVER

PRIORITY

This nonprovisional application is a U.S. National Stage Filing under 35 U.S.C. § 371 of International Patent Application Serial No. PCT/CN2013/071758 filed Feb. 22, 2013, and entitled "Time Sychronous Pluggable Transceiver".

TECHNICAL FIELD

The present invention relates to synchronisation in a pluggable transceiver module, in general, and in particular to time synchronisation in a small form-factor pluggable transceiver module.

BACKGROUND

Backhaul networks connect core network with smaller edge networks, or network elements. In mobile communications networks an example of a backhaul network (mobile backhaul) is a network connecting wireless base stations to their corresponding base station controllers. Using Ethernet for implementing these backhaul networks is becoming ever more popular solution.

Connecting Ethernet links to network devices (e.g. Ethernet switches) can be done via a Small Form-factor Pluggable (SFP) transceiver. Ethernet exists in both optical and electrical formats and SFPs that are present on the market support either electrical or optical Ethernet. Small Form-factor Pluggable transceivers give the flexibility of connecting to network devices electrical or optical Ethernet by using correct SFP, without any change to the network device itself. At one end a SFP comprises an interface for connecting the SFP to a motherboard of a network device, or host device, (e.g. switch). This end is commonly known as unit side. At the other end, also known as line side, the SFP comprises electro-mechanically standardised RJ45 socket for connecting electrical Ethernet cable. If the SFP supports optical Ethernet then instead of RJ45 socket a corresponding optical connector is present. Introduction of SFPs for electrical Ethernet has led to inclusion of an Ethernet PHY (physical layer) into the SFP to pre-process the standard electrical Ethernet signals to the point where they become sufficiently similar to electrical signals converted from optical Ethernet signals. This allows for using identical post processing electronics.

To use Ethernet in mobile backhaul effectively it is necessary to maintain time and frequency synchronisation. The most popular time and frequency synchronisation technologies for Ethernet currently are Precision Time Protocol (PTP) defined in IEEE1588 standard and synchronous Ethernet (SyncE) as specified in ITU-T Rec. G.8261, ITU-T Rec. G.8262 and ITU-T Rec. G.8264 standards.

However, introduction of the processing of Ethernet signals at physical layer in SFPs compromises the Synchronous Ethernet (SyncE) clock chain affecting IEEE1588 standard performance due to long intra-node path before/after timestamp for ingress/egress messages.

SUMMARY

It is the object of the present invention to obviate at least some of the above disadvantages and provide an improved a pluggable transceiver module and a method of time synchronisation in the pluggable transceiver module.

Accordingly, the invention seeks to preferably mitigate, alleviate or eliminate one or more of the disadvantages mentioned above singly or in any combination.

According to a first aspect of the present invention there is provided a pluggable transceiver module comprising a line receiver connected to a unit interface transmitter and a line transmitter connected to a unit interface receiver. The pluggable transceiver module also comprises a timestamp counter adapted to generate counter values based on clock signals received from an external source and to send the counter values to the line transmitter and to the line receiver. The line transmitter and the line receiver are adapted to associate timing packets in a stream of data packets transmitted and received by the pluggable transceiver module with counter values output by the timestamp counter.

According to a second aspect of the present invention there is provided a pluggable transceiver module comprising a unit interface receiver connected to a line transmitter. The unit interface receiver comprises a first clock and data recovery unit connected to a first jitter attenuator unit. Said first jitter attenuator unit is further connected to the line transmitter. The pluggable transceiver module further comprises a line receiver connected to a unit interface transmitter. The line receiver comprises a second clock and data recovery unit connected to a second jitter attenuator unit. Said second jitter attenuator unit is further connected to the unit interface transmitter. The first and second jitter attenuator units are adapted to reduce jitter in clock signals recovered by corresponding clock and data recovery units and to send output clock signals to the corresponding unit interface transmitter and line transmitter.

According to a third aspect of the present invention there is provided a method of synchronising time in a pluggable transceiver module comprising generating in the pluggable transceiver module a counter value based on timing signals received from an external source. The method further comprises sending the counter value to a line receiver and a line transmitter of the pluggable transceiver module and associating timing packets received from and transmitted to a network with received counter values.

According to a sixth aspect of the present invention there is provided a method of synchronising time in a pluggable transceiver module. The method comprises generating in the pluggable transceiver module a counter value based on data representative of time of day information, a first clock signal and a second clock signal, wherein the first and second clock signals are received from an external source. The method further comprises sending the counter value to a line receiver and a line transmitter of the pluggable transceiver module and associating timing packets received from and transmitted to a network with received counter values.

According to a fourth aspect of the present invention there is provided a method of recovering Synchronous Ethernet timing in a pluggable transceiver module. The method comprises recovering clock signals from incoming packets in a receiver of the pluggable transceiver module and reducing jitter in said clock signals. The clock signals with reduced jitter are sent to a transmitter of the pluggable transceiver module. The method further comprises using the clock signals with reduced jitter as the reference clocks by the transmitter for Synchronous Ethernet packet transmission.

According to a fifth aspect of the present invention there is provided a pluggable transceiver module comprising a unit interface transmitter and a unit interface receiver as well as a line transmitter and a line receiver. The pluggable transceiver module also comprises a non-volatile memory adapted to receive time of day information from an external source and a timestamp counter having an output connected to the line transmitter and to the line receiver. The timestamp counter further comprises a first input for receiving data representative of the time of day information from the non-volatile memory, a second input for receiving a first clock signal and a third input for receiving a second clock signal. The timestamp counter is adapted to use the first clock signal to generate a counter value and the second clock signal is used to trigger alignment of the counter value with the data representative of the time of day information received from the non-volatile memory. The line transmitter and the line receiver are adapted to associate timing packets with counter values output by the timestamp counter.

According to a sixth aspect of the present invention there is provided a method of synchronising time in a pluggable transceiver module. The method comprises generating in the pluggable transceiver module a counter value based on data representative of time of day information, a first clock signal and a second clock signal, wherein the first and second clock signals are received from an external source. The method further comprises sending the counter value to a line receiver and a line transmitter of the pluggable transceiver module and associating timing packets received from and transmitted to a network with received counter values.

Further features of the present invention are as claimed in the dependent claims.

BRIEF DESCRIPTION OF THE DRAWINGS

The present invention will be understood and appreciated more fully from the following detailed description taken in conjunction with the drawings in which.

DETAILED DESCRIPTION

For the sake of brevity references to Ethernet below refer to electrical Ethernet unless optical Ethernet is specifically mentioned.

Figure 1:
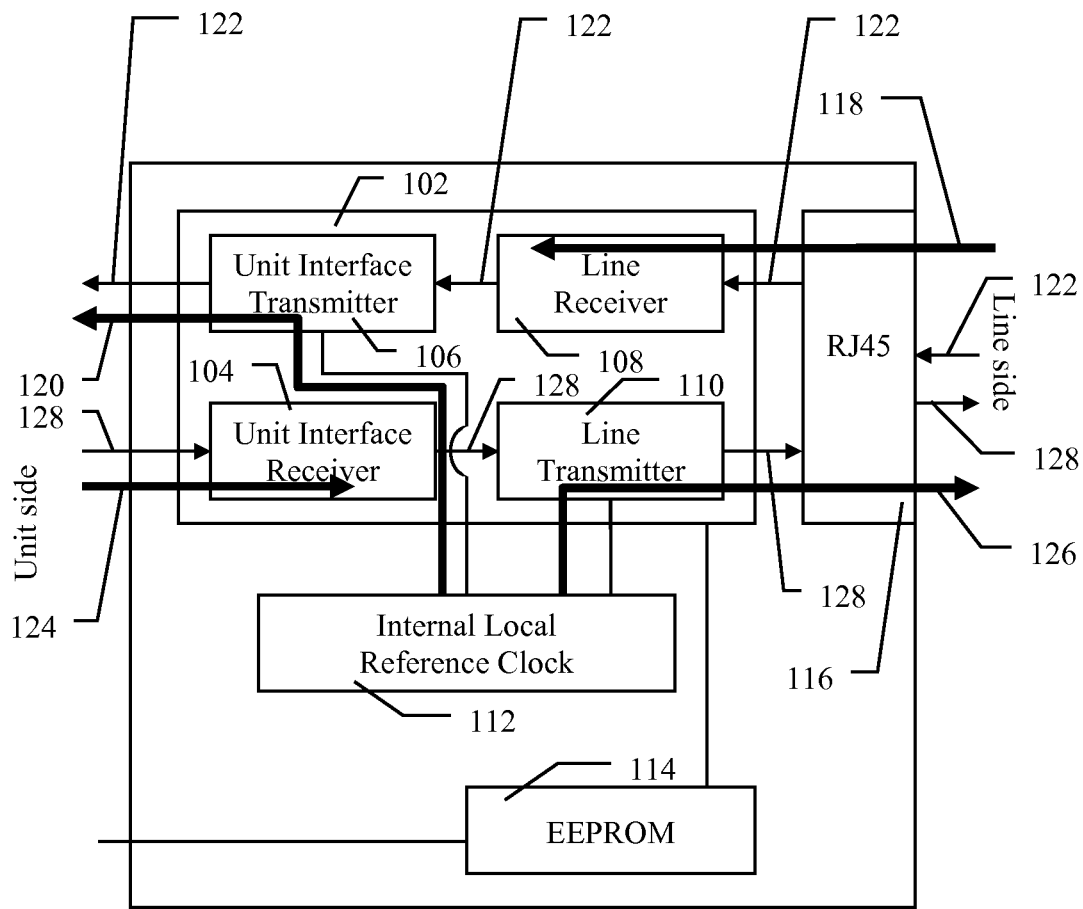
FIG. 1 is a diagram illustrating a known pluggable transceiver module.

As discussed earlier, processing of Ethernet signals at physical layer in electrical Ethernet SFPs disrupts Synchronous Ethernet (SyncE) clock chain. This situation is illustrated in FIG. 1, which depicts a basic diagram of a known electrical Ethernet SFP.

Pre-processing at physical layer (PHY) in a SFP, this part of the electronics on the printed circuit board of the SFP is marked as 102, has resulted in non-availability of recovered SyncE timing to the near Ethernet line card at the host device of the SFP in the receiving direction. As illustrated in FIG. 1 electrical Ethernet frames 122 arrive at the SFP 100 via RJ45 socket 116. These electrical Ethernet frames 122 carry SyncE timing denoted here as 118. Although the electrical Ethernet frames 122 are propagated through the electronics (line receiver 108 and unit interface transmitter 106) the SyncE timing is interrupted at the line receiver 108. A local oscillator works as internal local reference clock 112 of the PHY and is used to generate timing for the signal 122 transmitted from the unit interface transmitter 106 to the near Ethernet line card.

Further, the known solution is not capable of conveying high quality, node locked transmitting SyncE timing 124 to a remote Ethernet line card, i.e. in the opposite direction. Again, the root cause is that local oscillator works as internal local reference clock 112 of the PHY rather than the SyncE timing 124. Ethernet signal 128 traverses the SFP 100 going via unit interface receiver 104, line transmitter 110 and the RJ45 socket 116. The SyncE timing 124 initially received from the unit (e.g. Ethernet switch) is terminated at the unit interface receiver 104.

Using Ethernet for mobile backhaul (MBH) is becoming a popular solution. With increased transmission speed introducing time and frequency synchronisation (timing) for Ethernet tends to be more critical. IEEE1588 is currently the most popular packet based time synch technology. IEEE1588 is based on exchanging packet timestamp, so it is easy to implement and deploy. But stability of time sync performance is always the weak point for this packet based technology. In practice, the key factor affecting IEEE1588 time sync performance is the timestamp point.

The inventors have realised that to make the Precision Time Protocol, PTP, work well, the timestamp ought to be generated as near as possible to the Line interface, both for the incoming packets and for the outgoing ones. So the SFP is the most ideal point to generate PTP timestamp.

Figure 2:
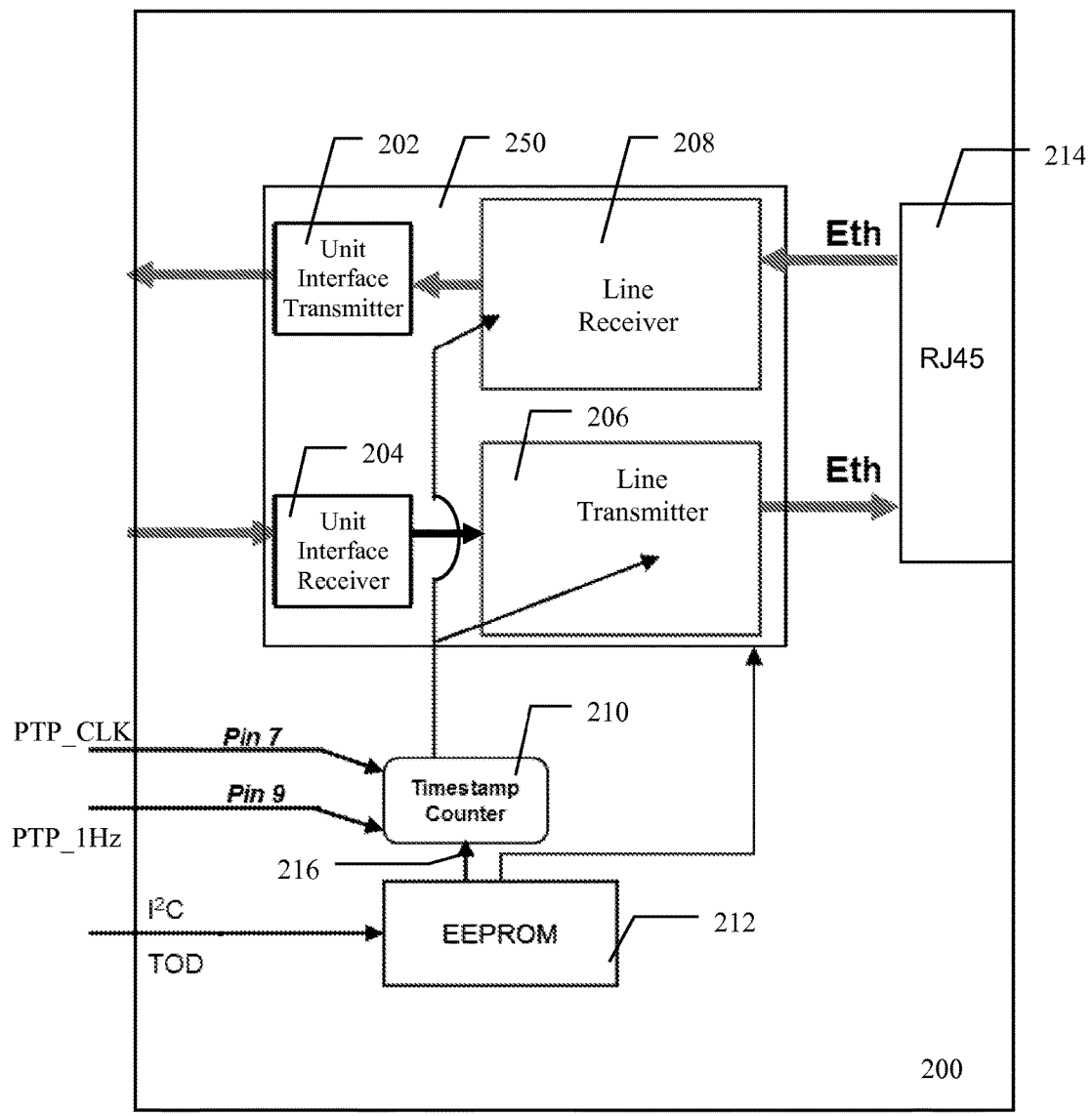
FIG. 2-FIG. 8 illustrate a pluggable transceiver module in various embodiments of the present invention.

With reference to FIG. 2 a pluggable transceiver module 200 in embodiment of the present invention is presented. The pluggable transceiver module 200 comprises a unit interface transmitter 202 and a unit interface receiver 204 on a unit side of the pluggable transceiver module. This side is connected to the hosting unit circuitry, e.g. switch, packet processor, network processor. The module 200 also has a line transmitter 206 and a line receiver 208 on a line side of the pluggable transceiver module. The line side is the side of the module 200 where an Ethernet cable is connected. In a preferred embodiment an RJ45 214 socket is located on the line side for connecting Ethernet cable. An internal wiring connects the RJ45 socket 214 to the line transmitter 206 and line receiver 208 located in physical layer electronics circuitry 250.

To address the problem of stability of time sync performance based on applying timestamp to packets/frames needing an accurate estimation of their arrival/departure (e.g. IEEE 1588 packets or ITU-T Y.1731/IEEE 802.1ag OAM Ethernet frames) the pluggable transceiver module 200 also comprises a timestamp counter 210, which is adapted to generate a counter value that is fed to the line transmitter 206 and the line receiver 208. The timestamp counter is very stable and precise thanks to timing sources it uses to generate the counter value.

In addition to the timestamp counter the module 200 comprises a non-volatile memory 212 adapted to receive configuration information, including time of day information, TOD, from an external source. In one embodiment Electrically Erasable Programmable Read-Only Memory (EEPROM) is used as the non-volatile memory 212, but other alternatives can also be used. In a preferred embodiment the time of day data is received by the EEPROM 212 via an I²C (Inter-Integrated Circuit) interface, which is especially beneficial in the case of a Small Form Factor Pluggable module because the TOD data can be provided by a CPU (central processing unit) 1202 resided on the host device 1200. The CPU 1202 of the host device 1200 comprises an I²C interface and using it to deliver the TOD data to the SFP is straightforward because SFP standards have already standardized the interface to an internal EEPROM for exchanging configuration info between the SFP and the CPU.

In the embodiment illustrated in FIG. 2 the physical layer electronics circuitry 250 comprises the line transmitter and receiver 206 and 208 and the unit interface transmitter and receiver 202 and 204 whereas the non-volatile memory 212 and timestamp counter 210 are implemented as separate modules.

The timestamp counter 210 further comprises a first input 216 for receiving data representative of the time of day information from the EEPROM memory 212, a second input, Pin 7, for receiving a first clock signal, PTP_CLK, and a third input, Pin 9, for receiving a second clock signal, PTP_1 Hz.

The timestamp counter, 210, is adapted to use the first clock signal, PTP_CLK, to generate a counter value and the second clock signal, PTP_1 Hz, is used to trigger alignment of the counter value with the data representative of the time of day information received from the EEPROM memory 212. The first clock signal, PTP_CLK, ensures that the Timestamp Counter, 210, runs at the right speed whereas the second clock signal, PTP_1 Hz, provides the phase of the counter, i.e. the second clock signal, PTP_1 Hz, aligns the beginning of each second with the beginning of the reference time, i.e. time of day. Given that, it still remains undetermined what is the second that it is beginning when there is the PTP_1 Hz transition (e.g. date+time: 2013.02.04.14.17.45), and this information is provided by the management plane (e.g. the CPU 1202 on the motherboard of the host device 1200) via the I²C interface by writing this date and time (with one second resolution) into a text marker inside the EEPROM memory 212 of the SFP 200. Then the rising edge of the second clock signal, PTP_1 Hz, will trigger timestamp counter to load the time data from EEPROM to the timestamp counter 210.

When the counter value is generated based on the three timing signals and sent out to the line transmitter 206 and the line receiver 208, the line transmitter 206 and the line receiver 208 associate PTP packets received from and transmitted to a network based on the counter values output by the timestamp counter 210. PTP packets carry timing information in accordance with IEEE1588. However, in alternative embodiments of this invention updating packet also covers situation that the stream of packets includes timing information different from IEEE1588 or does not include any timestamps and only after passing through the SFP in one embodiment of this invention the timestamps are applied.

In one embodiment the association of a timing packet with a counter value output by the timestamp counter comprises updating or modifying the timing packet by inserting the counter value into the timing packet itself. In an alternative embodiment the timing packet is not modified and the counter value that is associated with this timing packet is sent separately (in a follow-up packet).

In a preferred embodiment the first clock signal, PTP_CLK is a signal from a standard PTP clock as defined in IEEE1588 operating at 125 MHz. The second clock signal, PTP_1 Hz, which is the phase signal used to trigger the timestamp counter 210 to load the time data from EEPROM to the timestamp counter 210, the second clock operates at 1 Hz. Although the examples given above refer to implementing IEEE1588 synchronisation based on standard IEEE1588 clocks it would be clear for a person skilled in the art that the frequencies of the clocks can be different from the examples given above.

The timestamp counter, 210, is a counter that increases its value after each cycle, with each tick of the PT_P CLK 125 MHz clock signal, for IEEE1588 implementation. Alignment of the counter value with TOD is performed with 1 Hz frequency and this is triggered by the rising edge of the PTP_1 Hz signal. The counter values are used as timestamps that are inserted into PTP packets.

Preferably a full version of the timestamp is used which is 80 bits in total and can be represented as follows: YY:MM:DD:HH:MM:SS:mm:uu:nn, where

| | |
|---|---|
| YY—year; | SS—second; |
| MM—month; | mm—millisecond; |
| DD—day; | uu—microsecond; |
| HH—hour; | nn—nanosecond. |
| MM—minute; | |

TOD contains only the bits till the "Second" bit (SS). In this preferred embodiment (full version of the timestamp) the timestamp is 80 bits long and comprises TOD+counter value.

Figure 3:
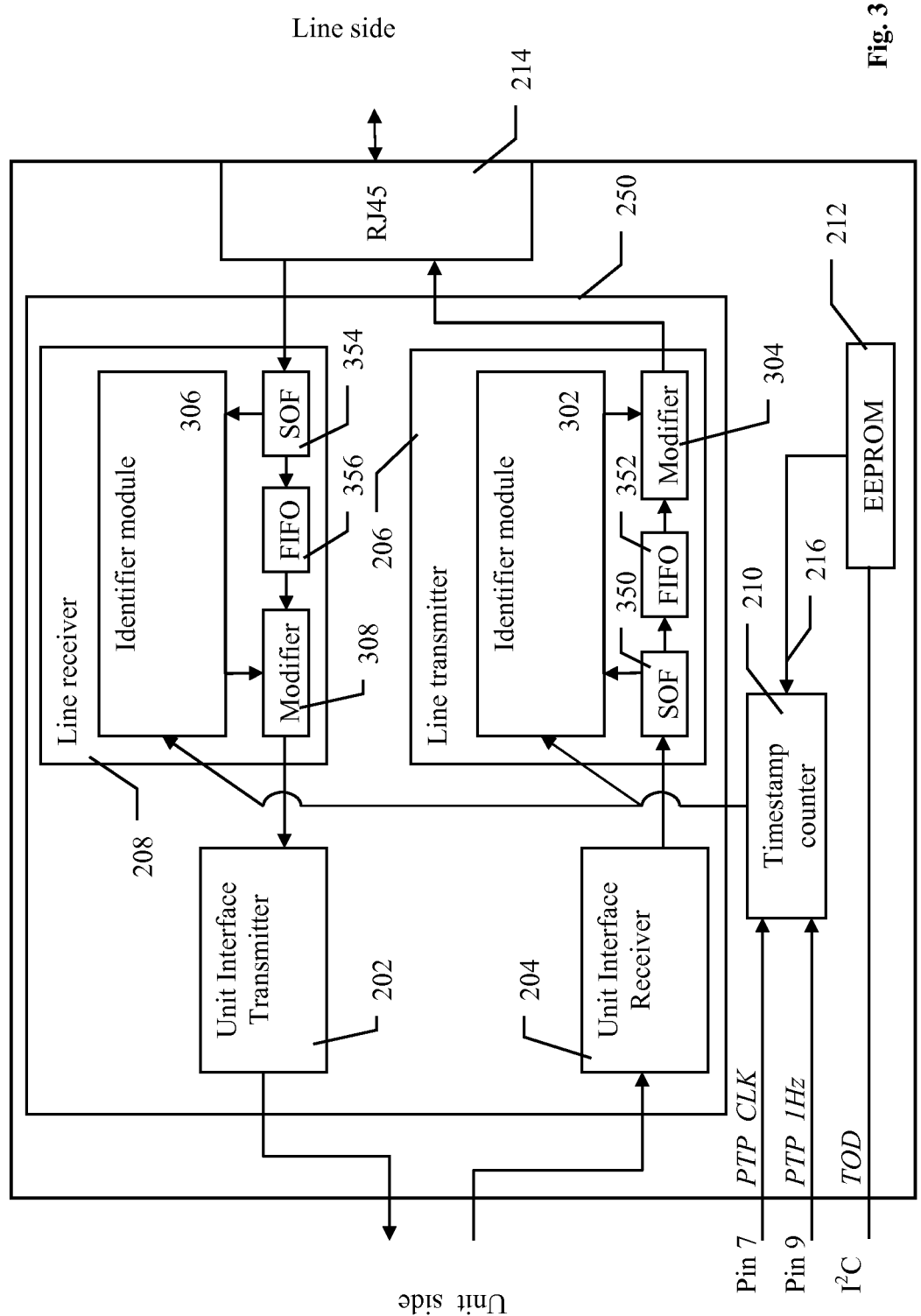

In an embodiment illustrated in FIG. 3 the line transmitter 206 of the pluggable transceiver module 200 comprises an first identifier module 302 adapted to identify timing packets and a first modifier module 304 adapted to update the identified timing packets with timestamps based on information received from the timestamp counter 210 and send the packets for onward transmission towards the line side interface. When a data packet (or Ethernet frame as the data packet is called when on an Ethernet link) is received at the line transmitter 206 and traverses through a first Start Of Frame (SOF) module 350, a first FIFO (First In First Out) module 352 and the first modifier module 304 before it is transmitted via the RJ45 socket 214. The SOF, FIFO and modifier modules are known from prior Small Form Factor Pluggable modules. In order to implement an embodiment of the present invention the first SOF module 350 sends copies of the received Ethernet frames to the first identifier module 302 and forwards the Ethernet frames to the first FIFO module 352 from where the frames after queuing in a first-in-first-out fashion are forwarded to the first modifier module 304. Using information in the frame the first identifier module 302 identifies packets carrying timing information (e.g. PTP or OAM packets) and instructs the first modifier module 304 to update timing information in the identified timing packets using timestamp received from the timestamp counter 210. In operation, a timing packet is received in the first modifier module 304 and when this happens the first identifier module 302 sends a timestamp to the first modifier module 304 which applies the timestamp and sends the timing packet via the RJ45 interface.

Similarly, the line receiver 208 of the pluggable transceiver module 200 comprises a second identifier module 306 adapted to identify timing packets and a second modifier module 308 adapted to update the identified timing packets with timestamps based on information received from the timestamp counter 210 and send the packets for onward transmission towards the unit side interface. Operation of the second identifier module 306, second modifier module 308 as well as a second SOF module 354 and a second FIFO module 356 are the same as discussed above in the context of the line transmitter 206. The difference is that in the case of line receiver 208 the Ethernet signals flow from the line side towards the unit side.

IEEE1588 standard specifies two modes of the synchronisation process: 1-step and 2-step modes.

In the 2-step-mode a master clock cyclically sends a synchronisation message with an estimated value of the time to connected slave clocks. Simultaneously the time at which the synchronisation message is sent is determined and recorded as precisely as possible. The master clock then sends this actual transmission time of the synchronisation message to the slave clocks in a follow-up message. A slave clock measures the reception time of the synchronisation message and the follow-up message and can calculates the offset to the master from it.

In the 1-step mode the master clock cyclically sends a synchronisation message with precise time to the connected slave, the time inserted into the synchronisation message is the actual time of sending the synchronisation message and it is inserted into the synchronisation message "on-the-fly" by the hardware. There is no follow-up message in 1-step mode. Calculation of the offset is done similarly to the 2-step mode.

More details about the IEEE1588 synchronisation can be found in the standard itself.

Figure 4:
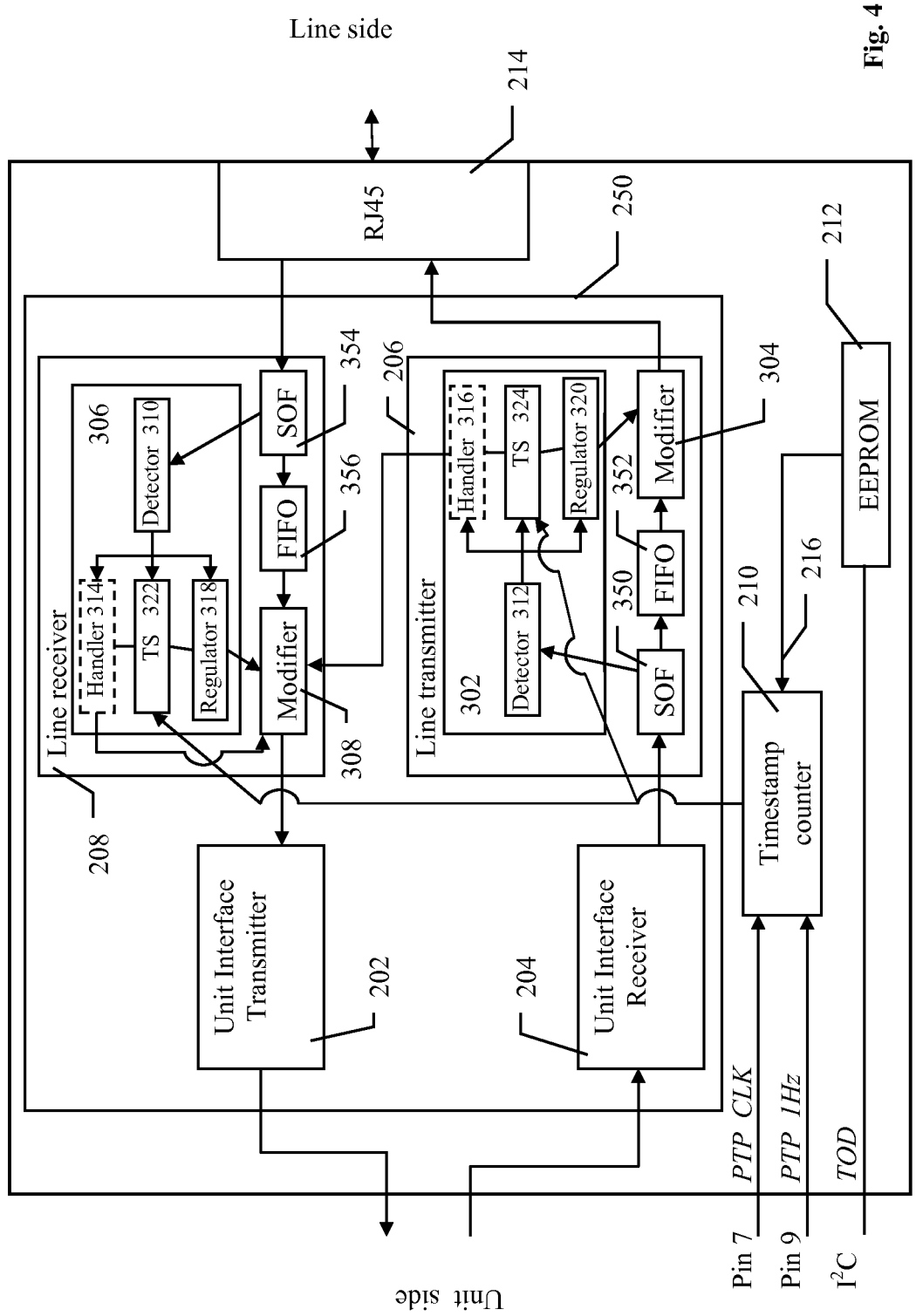

An embodiment for implementing synchronisation using 1-step or 2 step mode is illustrated in FIG. 4. For the 1-step mode the elements illustrated with dashed lines and connections and signals to and from the dashed elements should be ignored.

In an embodiment implementing the 1-step mode each one of the first and second identifier modules 302 and 306 comprises a detector module, a time stamp module and a regulator module. In particular the first identifier module 302 comprises a first detector module 312 connected to the first SOF module 350. The first detector module 312 operating on data packets flowing from the unit side towards the line side identifies timing packets and produces a trigger at detection of a timing packet. The trigger is sent to a first timestamp module 324 and to a first regulator module. The first timestamp module 324 generates a timestamp at said trigger from the first detector module 312 and based on information received from the timestamp counter 210. The timestamp counter 210 is connected to the first timestamp module 322. The first regulator module 320 at said trigger received from the first detector module 312 obtains the timestamp from the first timestamp module 324 and a message header information of an identified timing packet. The first regulator module 320 sends said timestamp and said header information to the first modifier module 304. Having the message header information the first modifier 304 can easily identify the right packet and modify this packet with the timestamp received with said message header information from the first regulator module 320.

Similar operations are performed in the second identifier module 306 but on data packets flowing from the line side towards the unit side. The second identifier module 306 comprises a second detector module 310 connected to the second SOF module 354. The second detector module 310 identifies timing packets and produces a trigger at detection of a timing packet, which trigger is then sent to a second timestamp module 322 and to a second regulator module 318. The second timestamp module 322, when triggered by the second detector module 310 generates a timestamp based on information received from the timestamp counter 210. In one embodiment generating a timestamp means that in the stream of counter values received from the timestamp counter 210 a counter value current at the time of the trigger is selected. In other word, the trigger causes making a snapshot of the rolling values of the counter and the value of the counter captured by the snapshot is the timestamp. The timestamp counter 210 is also connected to the second timestamp module 322. The second regulator module 318 at said trigger received from the second detector module 310 obtains the timestamp from the second timestamp module 322 and a message header information of an identified timing packet from the second detector module 310. The second regulator module 318 sends said timestamp and said header information to the second modifier module 308. Similarly to the first modifier module, the second modifier 308 having the message header information identifies the right packet and modifies this packet with the timestamp received with said message header information from the second regulator module 318.

In an additional embodiment the dashed elements and lines and signals to and from these dashed elements in FIG. 4 are added to implement operation in the 2-step mode. In this additional embodiment the first identifier module 302 comprises a first handler module 316 connected to the first timestamp module 324. The second identifier module 306 comprises a second handler module 314 connected to the second timestamp module 322. Both the first handler module 316 and the second handler module 314 are connected to the second modifier module 308 in the second identifier module 306 of the line receiver 208.

The first handler module 316 collects timestamp from its connected first timestamp module 324 at the time when the first detector module 312 triggers it after a timing packet is detected (PTP packet in the case of IEEE1588). There are two embodiments allowing for implementation of the 2-step mode. In the first embodiment, the first handler module 316 stores the timestamp and sends it to EEPROM 212, and a CPU (central processing unit) 1202 polls the EEPROM 212 via I2C to obtain this timestamp information. In the second embodiment the first handler module 316 generates a loopback packet with this timestamp information inserted and sends it to the second modifier 308 to be sent to precision time protocol (PTP) stack on the CPU 1202.

In the 2-step mode a timing packet (PTP packet for IEEE1588) is detected, timestamp generated for this timing packet, but instead of being inserted to said timing packet the timestamp is stored in the first handler 316. The timing packet is sent to the slave clock at the far end unmodified (it is the synchronisation message) and then a follow-up message is generated by PTP stack on the CPU 1202 containing the timestamp and an identifier of the timing packet with which the timestamp is associated. In one embodiment message header information of the timing packet can be used as the identifier. Both synchronisation and follow-up messages are then used in the far end slave clock to calculate the offset.

Figure 12:
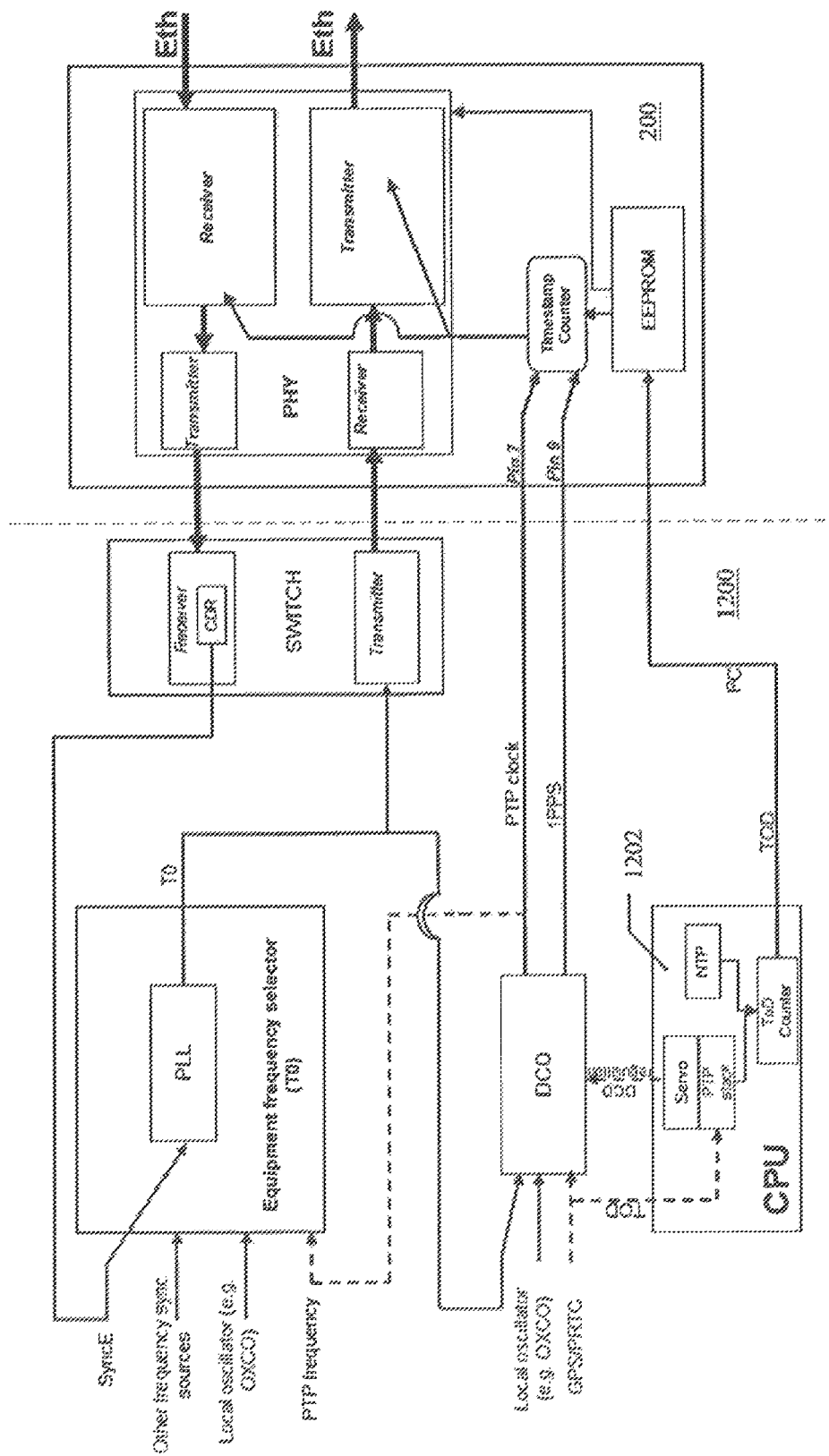
FIG. 12 is a diagram illustrating a pluggable transceiver module connected to a host device in one embodiment of the present invention.

In a preferred embodiment the CPU 1202 is installed on the motherboard of the host device. FIG. 12 illustrates in great simplification the pluggable transceiver module 200 connected to a host device 1200. The host device and its components are not part of this invention and will not be described here. However, their functions will be readily understandable for a person skilled in the art.

Preferably the pluggable transceiver module 200 is implemented a small form-factor pluggable (SFP) module. The advantage of implementing this invention as a SFP module is that thanks to standardised interfaces it can be used with a large number of switches and other network elements already supporting SFP modules.

For the existing SFP/SFP+/Electrical SFP module, there are two optional pins: pin 7 and pin 9. In other word, these two pins can be defined by user for specific function. In embodiments of the present invention these two pins are used to convey the time reference. The high quality first clock signal PTP_CLK used to drive the timestamp counter to generate timestamp data is delivered through pin 7. The second clock signal, PTP_1 Hz used to trigger the timestamp counter calibrating its time is delivered through pin 9. In this way the accurate time reference from a central system source, in one embodiment the IEEE1588 chip, is transmitted into SFP and drives the timestamp counter to function. In an alternative embodiment the reverse assignment of the clock signals to the pins is possible. At the same time the existing I²C interface can be used to deliver the TOD signal, pins 4 and 5 are used in the existing SFP/SFP+/Electrical SFP modules for the I²C interface.

By using these two pins, the high quality, PTP recovered clock and 1PPS signal can be transmitted into SFP as accurate time reference. Then the SFP is able to include the time synch function.

The pin description of a Time Synchronous Electrical SFP according to an embodiment of the present invention is presented in table 1. Elements in italic indicate the new functions of pins 7 and 9:

TABLE 1

| Pin Number | Name | Description |
|---|---|---|
| 1 | VeeT | Transmitter Ground |
| 2 | TX Fault | Transmitter Fault Indication - High Indicates a Fault |
| 3 | TX Disable | Transmitter Disable - Module disables on high or open |
| 4 | MOD-DEF2 | Module Definition 2 - Data line of Two wire serial ID interface |
| 5 | MOD-DEF1 | Module Definition 1 - Clock line of Two wire serial ID interface |
| 6 | MOD-DEF0 | Module Definition 0 - Grounded in module |
| 7 | *PTP_clk* | *Timestamp counter driven clock, 125 MHz single ended clock. It is driven by the external PTP chip.* |
| 8 | LOS | Loss of Signal - High Indicates Loss of Signal |
| 9 | *PTP_1Hz* | *Timestamp counter time/phase calibrating trigger. 1 Hz single ended clock. 1PPS signal rising edge will trigger timestamp counter to load the time of day data from EEPROM.* |
| 10 | VeeR | Receiver Ground |
| 11 | VeeR | Receiver Ground |
| 12 | RD− | Inverse Received Data Out |
| 13 | RD+ | Received Data Out |
| 14 | VeeR | Receiver Ground |
| 15 | VccR | Receiver Power - 3.3 V +/− 5% |
| 16 | VccT | Transmitter Power - 3.3 V +/− 5% |
| 17 | VeeT | Transmitter Ground |
| 18 | TD+ | Transmitter Data In |
| 19 | TD− | Inverse Transmitter Data In |
| 20 | VeeT | Transmitter Ground |

Furthermore it is advantageous that the present invention is backward compatible with known SFP solutions. There is an EEPROM inside the Electrical SFP, with 128 registers. In one embodiment a new extra register, address 96, is used to enable the time synchronisation function and select pin 7 and pin 9 as time reference. Bit 0 of register 96 controls the selecting.

In one embodiment the host device can configure this register through the two wire serial ID interface, i.e. I²C interface connected through pin 4 and pin 5. In one embodiment of the present invention the default value of bit 0 of register 96 is 1 to select the first clock signal, PTP_CLK, from pin 7, and the second clock signal, PTP_1 Hz, from pin 9 as time reference. After power up, the host device can change this register to select to enable pin 7 and pin 9 as time reference or not, which depends on whether this is a Time Synchronous Electrical Ethernet SFP or not. In this way the host devices can accept and operate with devices according to embodiments of the present invention (i.e. Time Synchronous Pluggable Transceiver) as well as with legacy SFPs that do not support solutions based on this invention.

The definition of new added register 96 for time reference enable is shown in table 2.

TABLE 2

| bit | | Description |
|---|---|---|
| 7 | Read/Write | Reserved |
| 6 | Read/Write | Reserved |
| 5 | Read/Write | Reserved |
| 4 | Read/Write | Reserved |
| 3 | Read/Write | reserved |
| 2 | Read/Write | reserved |
| 1 | Read/Write | reserved |
| 0 | Read/Write | Default: 1, 1: select the time reference PTP_clk and PTP_1Hz from pin 7 and pin 9 0: does not select time reference |

The Time Synchronous Pluggable Transceiver according to embodiments of the present invention functions in almost the same way as the existing SFP, except for the ability to select the time reference and enable time synch function and/or SyncE function. In consequence the Time Synchronous Pluggable Transceiver can be used as an alternative for the existing electrical SFP when the host configures the register to select the time reference clock from pin 7 and pin 9.

Accurate time of day (TOD) data is firstly saved into a register in EEPROM via the I²C interface. The time of day information is a 48 bits long and in one embodiment the EEPROM reserved registers 60-62 and 92-94 can be used to store them. In one embodiment register 60-62 is the high 24 bits of the time of date data and register 92-94 is the low 24 bits of the time of date data. In alternative embodiment the reverse is also possible. As described earlier the second clock signal, PTP_1 Hz, rising edge triggers timestamp counter 210 to load the time data from the EEPROM 212 in the process of generating the timestamp.

Table 3 defines the addresses of the EEPROM 212 in one embodiment of the present invention.

TABLE 3

| Data Address | Field Size (Bytes) | Name of field | Description of field |
|---|---|---|---|
| BASE ID FIELDS | | | |
| 0 | 1 | Identifier | Type of serial transceiver (see Table 3.2) |
| 1 | 1 | Ext. Identifier | Extended identifier of type of serial transceiver |
| 2 | 1 | Connector | Code for connector type (see Table 3.3) |
| 3-10 | 8 | Transceiver | Code for electronic compatibility or optical compatibtility (see Table 3.4) |
| 11 | 1 | Encoding | Code for serial encoding algorithm (see Table 3.5) |
| 12 | 1 | BR, Nominal | Nominal bit rate, units of 100 MBits/sec. |
| 13 | 1 | Reserved | |
| 14 | 1 | Length (9 mm) - km | Link length supported for 9/125 mm fiber, units of km |
| 15 | 1 | Length (9 m) | Link length supported for 9/125 mm fiber, units of 100 m |
| 16 | 1 | Length (50 m) | Link length supported for 50/125 mm fiber, units of 10 m |
| 17 | 1 | Length (62.5 m) | Link length supported for 62.5/125 mm fiber, units of 10 m |
| 18 | 1 | Length (Copper) | Link length supported for copper, units of meters |
| 19 | 1 | Reserved | |
| 20-35 | 16 | Vendor name | SFP transceiver vendor name (ASCII) |
| 36 | 1 | Reserved | |
| 37-39 | 3 | Vendor OUI | SFP transceiver vendor IEEE company ID |
| 40-55 | 16 | Vendor PN | Part number provided by SFP transceiver vendor (ASCII) |
| 56-59 | 4 | Vendor rev | Revision level for part number provided by vendor (ASCII) |
| 60-62 | 3 | ToD_data_1 | First 24 bits of the time of date data |
| 63 | 1 | CC_BASE | Check code for Base ID Fields (addresses 0 to 62) |
| EXTENDED ID FIELDS | | | |
| 64-65 | 2 | Options | Indicates which optional SFP signals are implemented (see Table 3.6) |
| 66 | 1 | BR, max | Upper bit rate margin, units of % |
| 67 | 1 | BR, min | Lower bit rate margin, units of % |
| 68-83 | 16 | Vendor SN | Serial number provided by vendor (ASCII) |
| 84-91 | 8 | Date code | Vendor's manufacturing date code (see Table 3.7) |
| 92-94 | 3 | ToD_data_2 | Last 24 bits of the time of data data |
| 95 | 1 | CC_EXT | Check code for the Extended ID Fields (addresses 64 to 94) |
| VENDOR SPECIFIC ID FIELDS | | | |
| 96 | 1 | Ref_Time._sel | select the time reference for the SFP |
| 97-127 | 31 | Read-only | Vendor specific date, read only |

Figure 5:
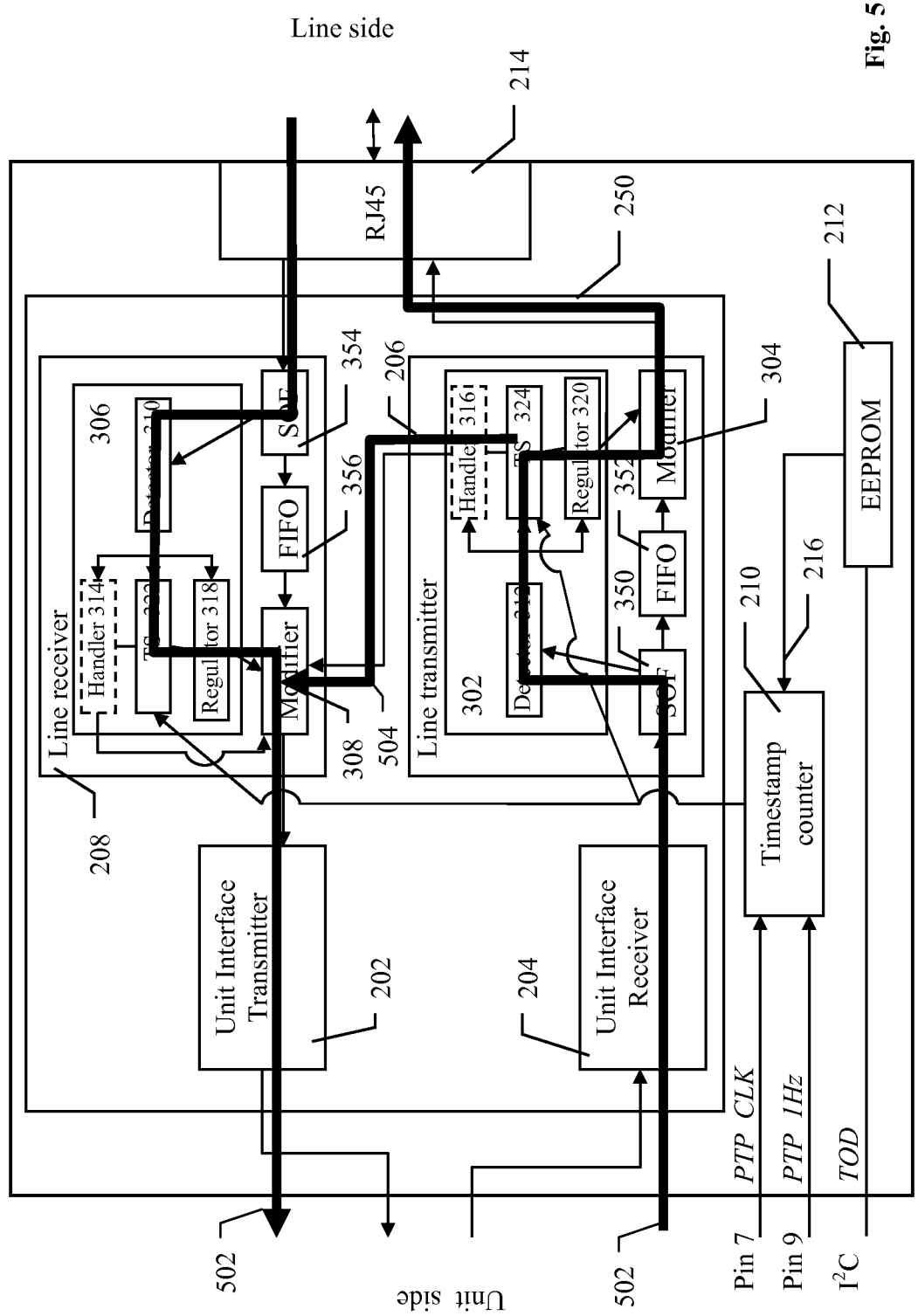

Time synchronisation path 502 inside the SFP based on IEEE1588 packets (or OAM packets) in accordance with embodiments of the present invention is shown in FIG. 5. Line 504 illustrates the loop-back in 2-step mode.

PTP is a packet based Layer2/Layer3 time distribution function. And to make the PTP slave locked to its master fast and its local clock stable, the timestamp ought to be generated as close as possible to the wire at both sides. So the SFP is the most ideal place to generate PTP timestamp. The embodiments of the present invention allow the SFP to generate most accurate timestamps through a time reference made available by an external circuitry of the host device/equipment.

In addition to IEEE1588, the timestamp function in various embodiments of the present invention can also support OAM 1-way and 2-way delay measurement, e.g. MPLS OAM, Ethernet Service OAM.

Figure 6:
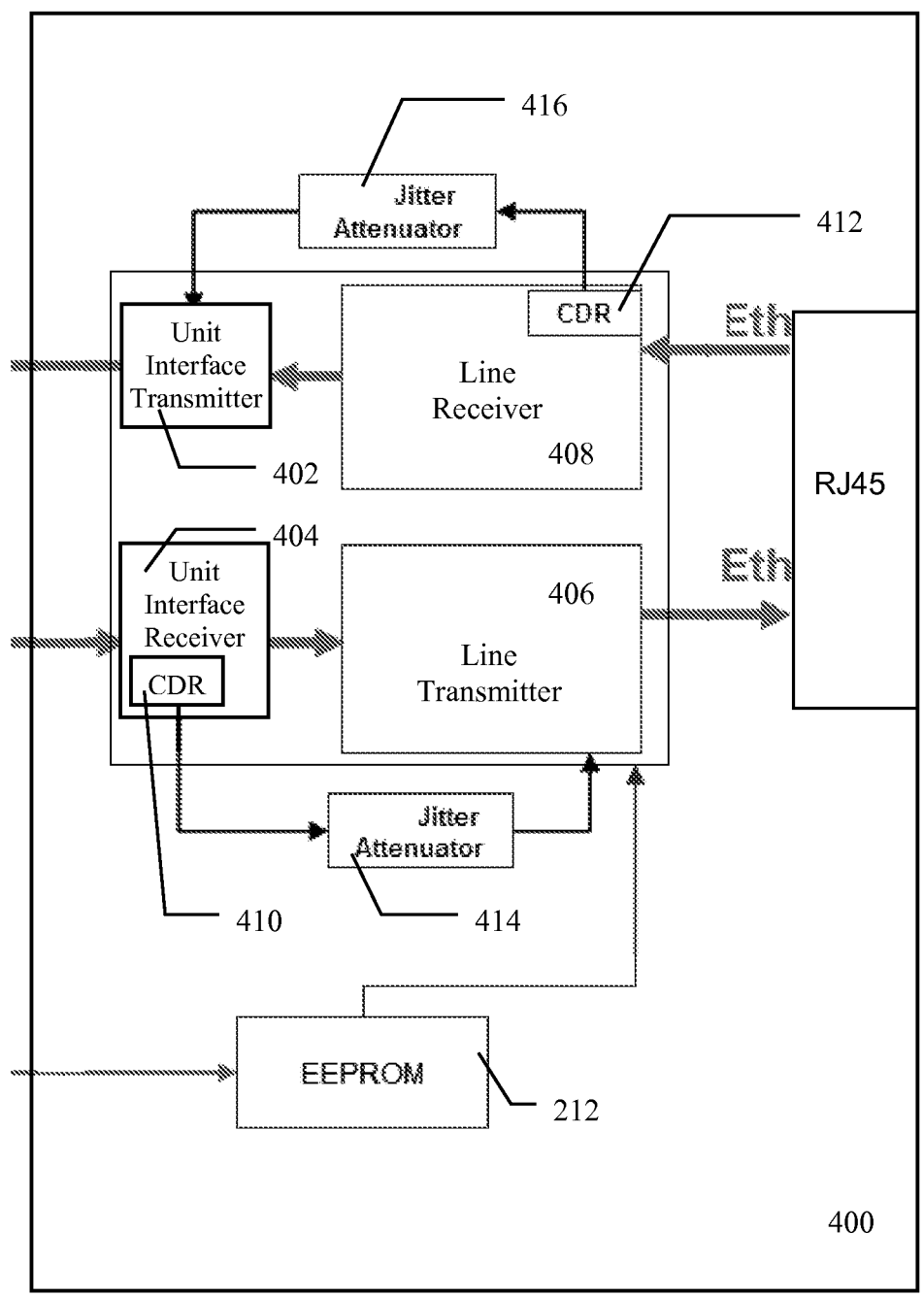

FIG. 6 shows an embodiment of a pluggable transceiver module 400 that enables synchronous Ethernet (SyncE) operation. In one embodiment the PHY closest to the customer traffic path produces the extracted receiver clock and also uses a high quality, node locked, transmit clock in the transmit direction. Embedding the receiver clock and transmit clock into the Tx/Rx data streams in a pluggable transceiver module is very convenient and has minimised system impact.

In synchronous Ethernet the SyncE timing is embedded in the incoming data.

In one embodiment the pluggable transceiver module 400 comprises a unit interface receiver 404 on a unit side connected to a line transmitter 406 on a line side of the pluggable transceiver module. The unit interface receiver 404 comprising a first clock and data recovery unit (CDR) 410 connected to a first jitter attenuator unit 414. The first jitter attenuator unit 414 is connected to the line transmitter 406. In operation, the CDR 410 recovers the clock from the incoming data and the jitter attenuator 414 reduces the jitter from the recovered clock and outputs a high quality clock signal. This high quality recovered clock is used as the reference clocks by the line transmitter 406.

In the opposite direction, a line receiver 408 on the line side of the pluggable transceiver module is connected to a unit interface transmitter 402 on the unit side of the pluggable transceiver module. The line receiver 408 comprises a second clock and data recovery unit 412 connected to a second jitter attenuator unit 416. The second jitter attenuator unit 416 is further connected to the unit interface transmitter 402. The operation of the chain: receiver-CDR-jitter attenuator-transmitter is the same in both directions. The transmitters, either on unit side or line side, use this high quality recovered clock to be the reference clock for Synch Ethernet packet transmission.

Figure 7:
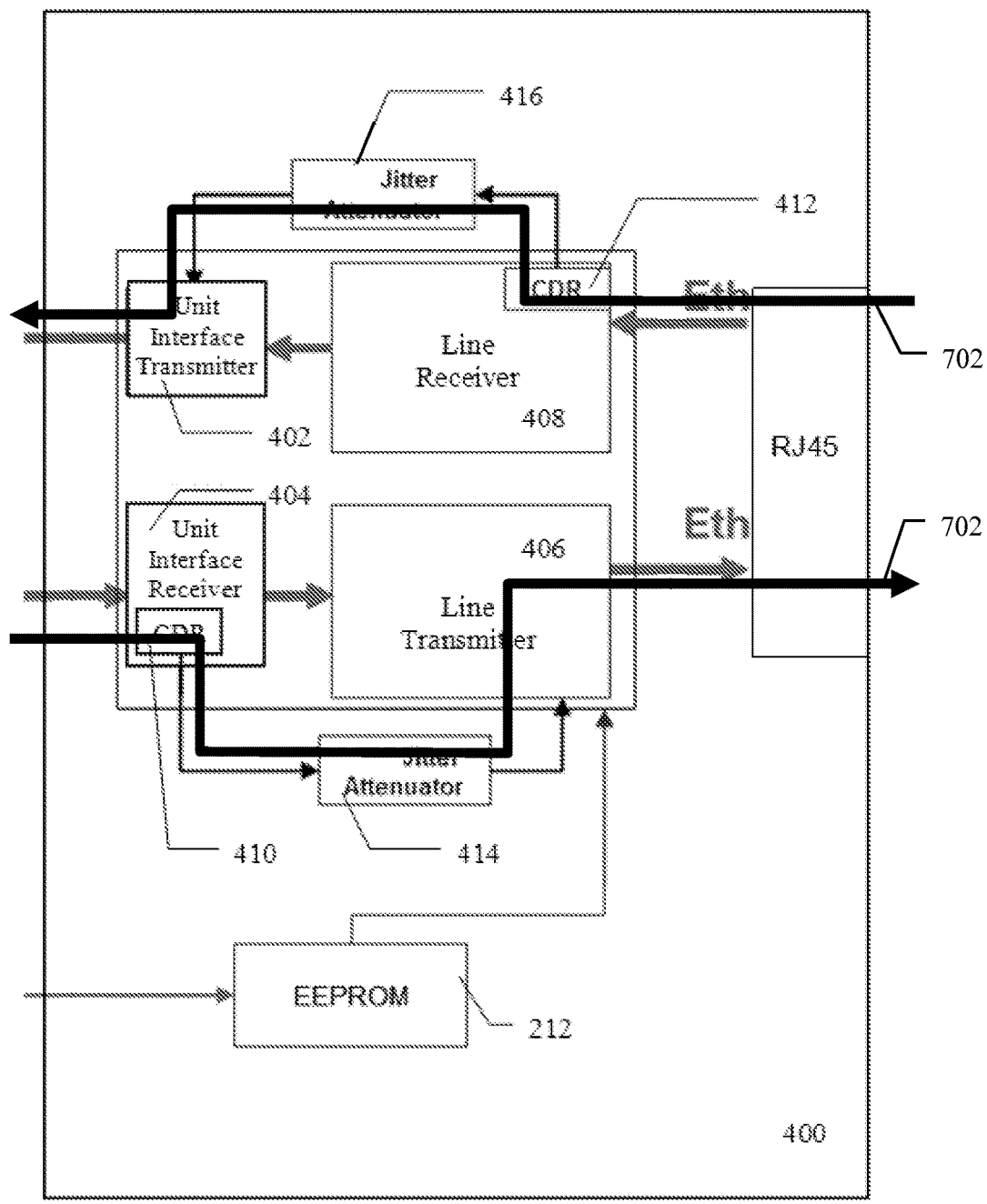

SyncE timing path 702 inside an SFP is depicted in FIG. 7; it is continuous, which means that it exchanges the SyncE timing between the unit side and line side successfully. This allows the SFP to meet the SyncE requirements.

In a preferred embodiment the first and second jitter attenuators 414 and 416 are based on a phased locked loop, PLL.

Figure 11:
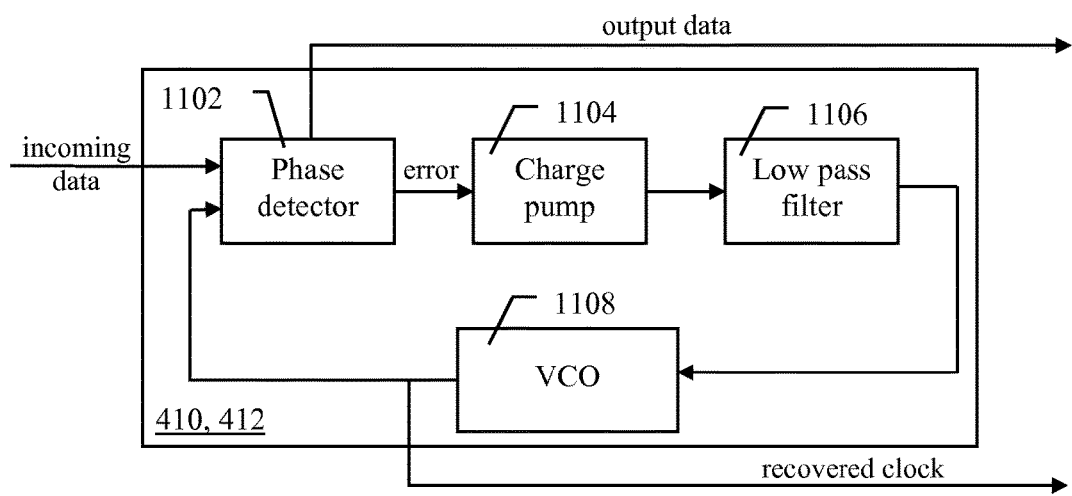
FIG. 11 is a diagram illustrating a clock and data recovery unit in one embodiment of the present invention.

One embodiment of a clock and data recovery CDR module 412 is illustrated in FIG. 11. The CDR 412 extracts embedded clock information and data from an incoming data stream. In one embodiment the clock and data recovery module 412 is implemented as a phase locked loop, PLL, similarly as the jitter attenuator 414, 416. The CDR 412 comprises a first phase detector 1102 receiving as one input incoming data stream and a clock signal produced by a first voltage controlled oscillator 1108. The first phase detector 1102 detects if data transmission occurred within a current sample period and produces a phase error output signal as well as data output (its is the same data as the incoming data, but filtered in the phase detector). This retimed data is propagated across the pluggable module 400 to the transmitter 402, 406. The electrical phase error signal output by the first phase detector 1102 is proportional to phase difference between the clock signal produced by the first VCO 1108 and the clock signal present in the incoming data stream. A charge pump 1104 receives the phase error signal from the first phase detector and is connected to a first low pass filter 1106. The charge pump 1104 working with the first low pass filter 1106 attenuate jitter. The first low pass filter 1106 produces a tuning electrical signal to control the first voltage controlled oscillator 1108. Output of the first voltage control oscillator 1108 is looped back to the first phase detector 1102. Eventually the frequency and phase of the signal generated by the first VCO 1108 is the same as the clock in the incoming data stream and the first VCO 1108 is "locked" in the sense that the tuning voltage from the first low pass filter 1106 does not change the frequency or phase of the first VCO 1108. By forming a closed-loop system and using negative feedback, the loop ensures that the input frequency equals the reference frequency and also that the phase of these two signals are fixed with respect to each other. Part of the signal generated by the first VCO 1108 is taped and fed to the jitter attenuator 414, 416.

Figure 10:
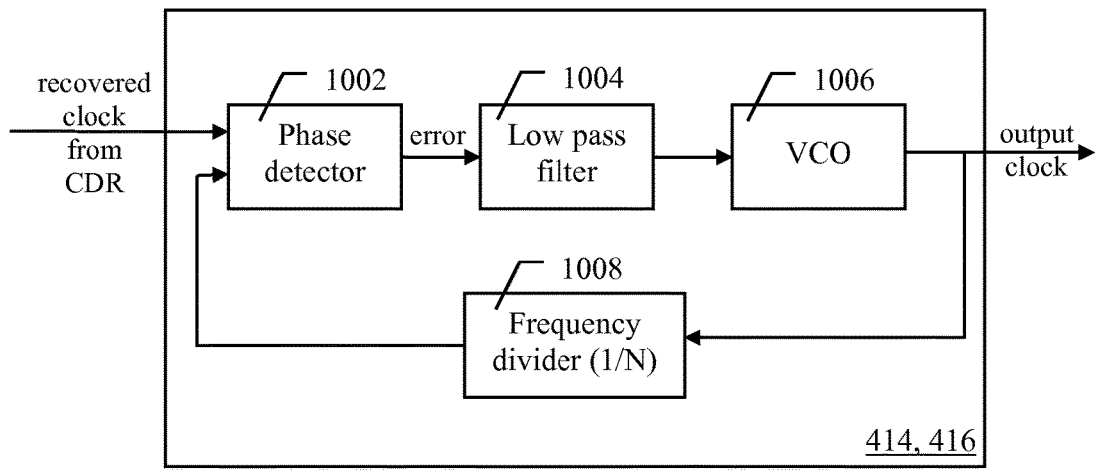
FIG. 10 is a diagram illustrating a jitter attenuator module in one embodiment of the present invention.

One embodiment of a jitter attenuator, 414, 416, based on a PLL is illustrated in FIG. 10. Phase detector 1002 detects phase error between two clock inputs. One clock input FIG. 10 is the clock extracted by the CDR 410, 412 from the incoming data stream. The other input is a clock signal generated by the voltage controlled oscillator (VCO) 1006. The phase detector 1002 generates an electrical signal depending on phase error (or phase difference between the clock signal the VCO 1006 produces and the clock extracted by the CDR 412 from the incoming data stream). This electrical signal is then fed to a low pass filter 1004. The low pass filter 1004 removes any remaining high frequency noise to produce a tuning voltage to the VCO. The VCO output is looped back to the phase detector via an optional divider 1008. Eventually the frequency and phase of the signal generated by the VCO 1006 is the same as the clock extracted by the CDR from the incoming data stream (i.e. reference clock) and the VCO 1006 is "locked" in the sense that the tuning voltage from the low pass filter does not change the frequency or phase of the VCO. Part of the signal generated by the VCO 1006 is taped and fed to the transmitter 402 in the pluggable transceiver module 400. In consequence the VCO 1006 clock signal is the same as the one extracted by the CDR, 410, 412 from the incoming data stream, but without the jitter because it is generated anew.

The difference of these two phase locked loops is jitter performance. The recovered clock output from CDR 410, 412 does not meet the requirement of Sync and an PLL operating as a jitter attenuator is used. The CDR 410, 412 lock quickly, but the jitter performance is below that of the jitter attenuator 414, 416. The PLL in the jitter attenuator 414, 416 has lower bandwidth and longer lock time, compared with the CDR, but can reduce the jitter more.

In fact jitter can never be removed completely, it can only be reduced. But the low pass filter can filter out the jitter. The bandwidth and damping factor, and other parameter of a low pass filter will affect the jitter attenuator performance. Therefore two different PLLs (CDR 412 and jitter attenuator 416) are preferably used for different applications. Eventually, after the clock signal passed through both PLLs the clock signal meets the requirements of SyncE.

Figure 8:
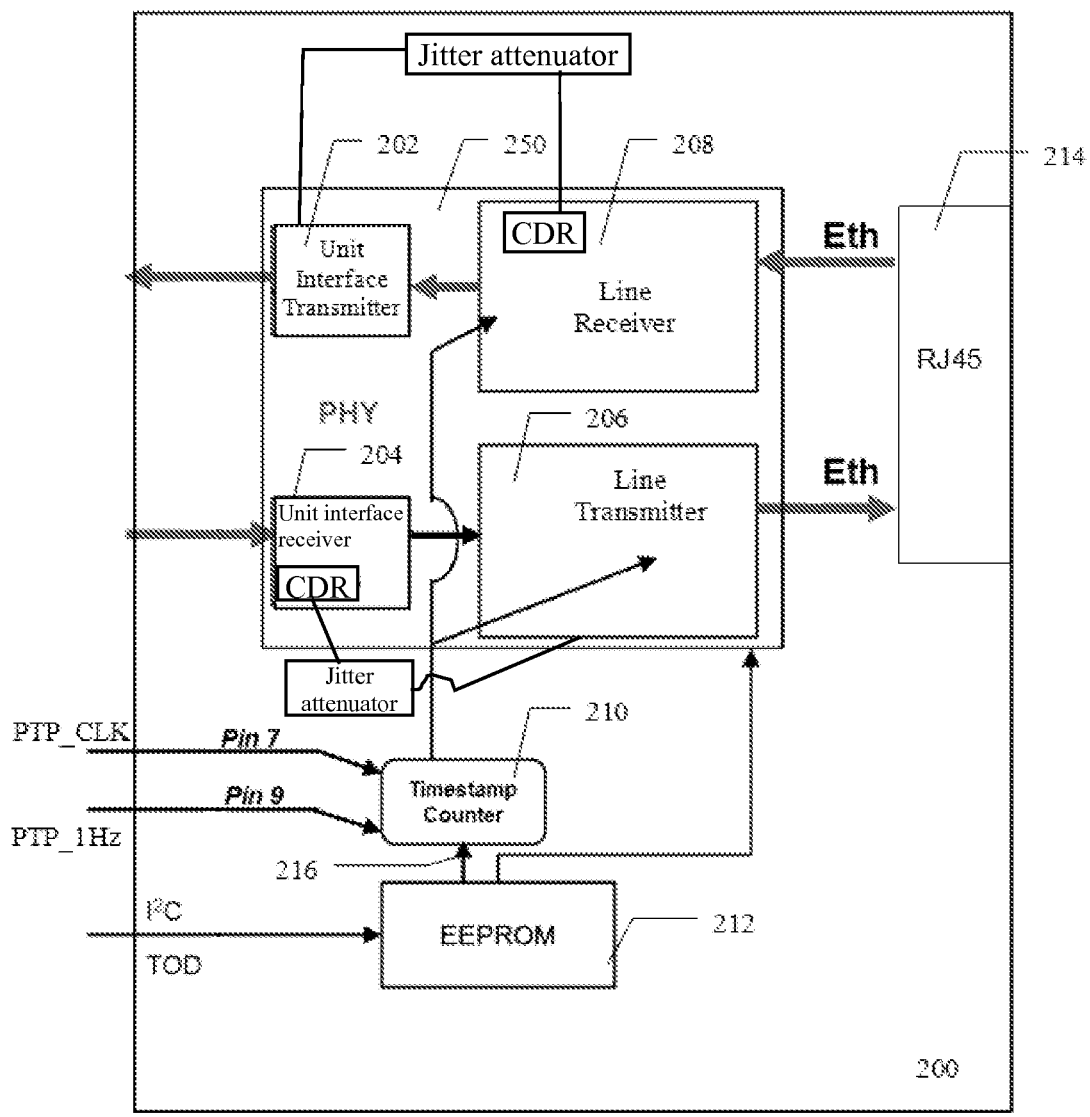

In a preferred embodiment illustrated in FIG. 8 the pluggable transceiver module, e.g. a SFP, combines solutions disclosed in embodiments addressing IEEE1588 and SyncE time and frequency synchronisation. The embodiment combines the precise timestamp counter 210 producing timestamps used to calculate offset at the slave clock as described earlier and jitter attenuation in recovered clocks to enable SyncE across a the pluggable transceiver module.

Figure 9:
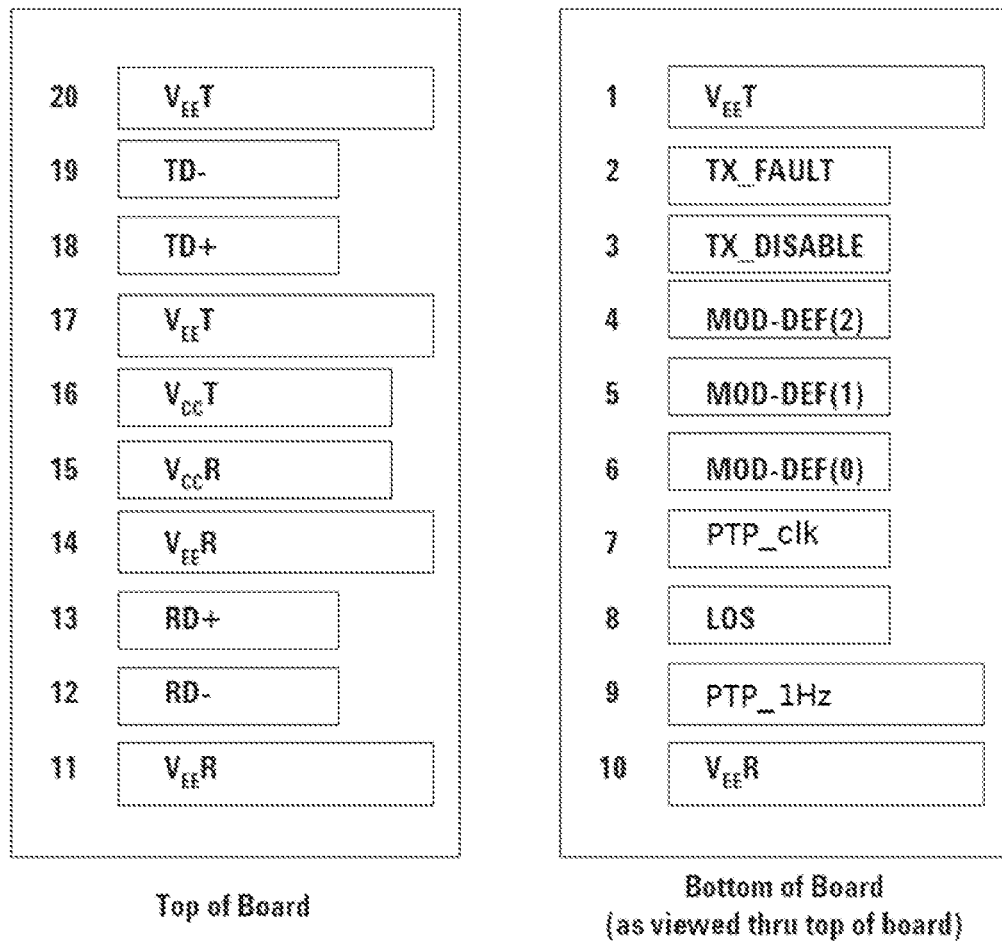
FIG. 9 is a diagram illustrating a printed circuit board of the unit side interface of a pluggable transceiver module in one embodiment of the present invention.

FIG. 9 illustrates one embodiment of a printed circuit board of the unit side interface that enables backward compatibility with existing SFP solutions. It is pin to pin compatible with the existing SFP.

It will be appreciated by those skilled in the art that the present invention is advantageous over prior art solutions in that it is a truly flexible electrical PTP and/or SyncE design. In particular, in the case of SFP transceivers by using existing interface it is possible to design and manufacture SFP transceivers that are backward compatible with existing host devices and allow for implementing solutions requiring time synchronous Ethernet. Compared to the transceiver illustrated in FIG. 1 the present invention in its various embodiments does not require the local clock 112 because in embodiments related to the SyncE illustrated in FIGS. 6, 7 and 8 the jitter attenuator removes/reduces jitter in the timing signal recovered at their respective receivers and feeds this timing to its corresponding transmitters. In consequence the timing is not interrupted at PHY. Similarly, in the embodiments related to PTP illustrated in FIGS. 2-5 and 8 the timestamp counter using the external timing signals locally generates counter values used for PTP packets and because it is based on high precision PTP clock from the unit there is no need for local oscillator generating timing pulses.

Figure 13:
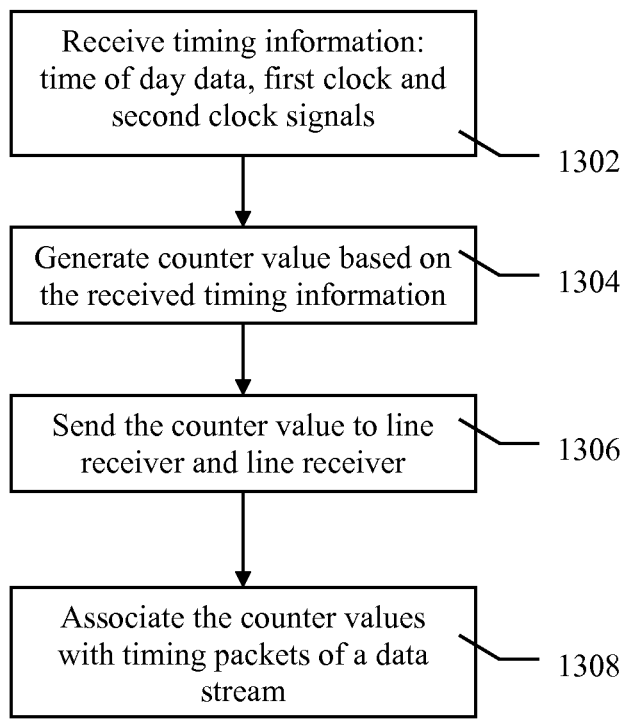
FIG. 13-FIG. 15 illustrate a method of synchronising time in a pluggable transceiver module in various embodiments of the present invention.

One embodiment of a method of synchronising time in a pluggable transceiver module 200 is illustrated in FIG. 13. The method, implemented in a pluggable transceiver as disclosed in embodiments discussed above and illustrated in FIGS. 2-12 comprises generating 1304 in the pluggable transceiver module 200 a counter value, which is based on data representative of time of day information, TOD, a first clock signal, PTP_CLK, and a second clock signal, PTP_1 Hz. The first and second clock signals are received from an external source. In a preferred embodiment the first clock signal, PTP_CLK, is used to generate a counter value whereas the second clock signal, PTP_1 Hz, is used to trigger alignment of the counter value with the data representative of the time of day information. The TOD information is received by the pluggable module from the CPU (central processing unit) 1202 resided on the host device 1200 and stored in EEPROM memory 212 and then, from the EEPROM memory 212 it is obtained for use in the generation of the counter values. The first clock signal, PTP_CLK, ensures that the Timestamp Counter, 210, generatin the counter runs at the right speed whereas the second clock signal, PTP_1 Hz, provides the phase of the counter, i.e. the second clock signal, PTP_1 Hz, aligns the beginning of each second with the beginning of the reference time, i.e. time of day, TOD. The method further comprises sending

1306 the counter value to a line receiver and a line transmitter of the pluggable transceiver module 200. In the line receiver and the line transmitter a step of associating 1308 timing packets received from and transmitted to a network with the received counter values is performed.

Figure 14:
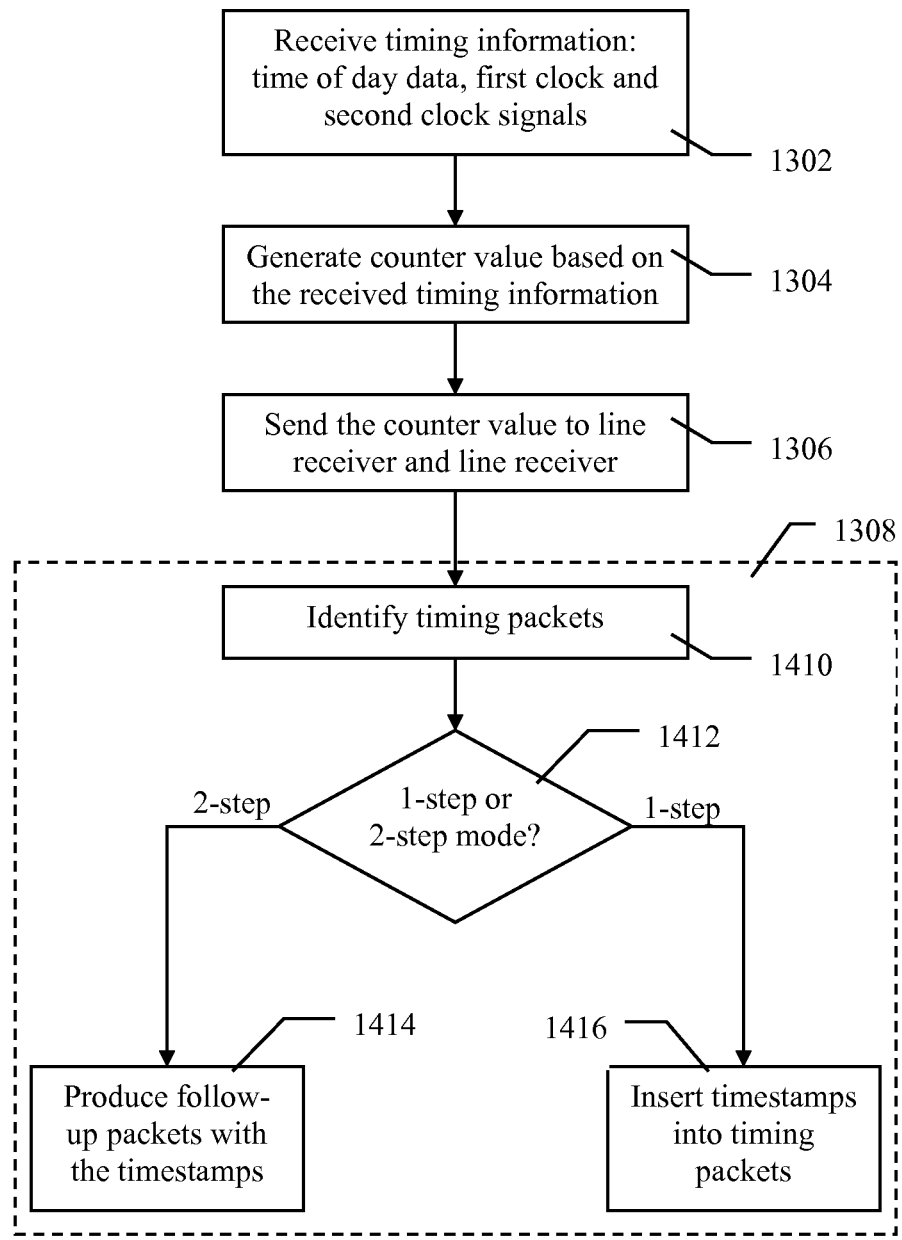

Preferably, as illustrated in FIG. 14, the step of associating comprises identifying 1410 timing packets in a stream of packets sent to and received from the network. These timing packets can be, for example PTP packets according to IEEE1588 or ITU-T Y.1731/IEEE 802.1ag OAM Ethernet frames.

In one embodiment, (the 2-step mode described earlier), the timing packets are identified and the method comprises associating 1414 these identified timing packets with timestamps based on the received counter values. The association is realised by producing a follow-up packet that includes the timestamp whereas the timing packet is not modified. The timing packet and the follow-up packet are sent separately.

In an alternative embodiment, (1-step mode), the step of associating comprises updating 1416 the timing packets based on the received counter values. In this embodiment the association of a timing packet with the counter value comprises updating, or modifying, the timing packet by inserting the counter value into the timing packet itself.

Figure 15:
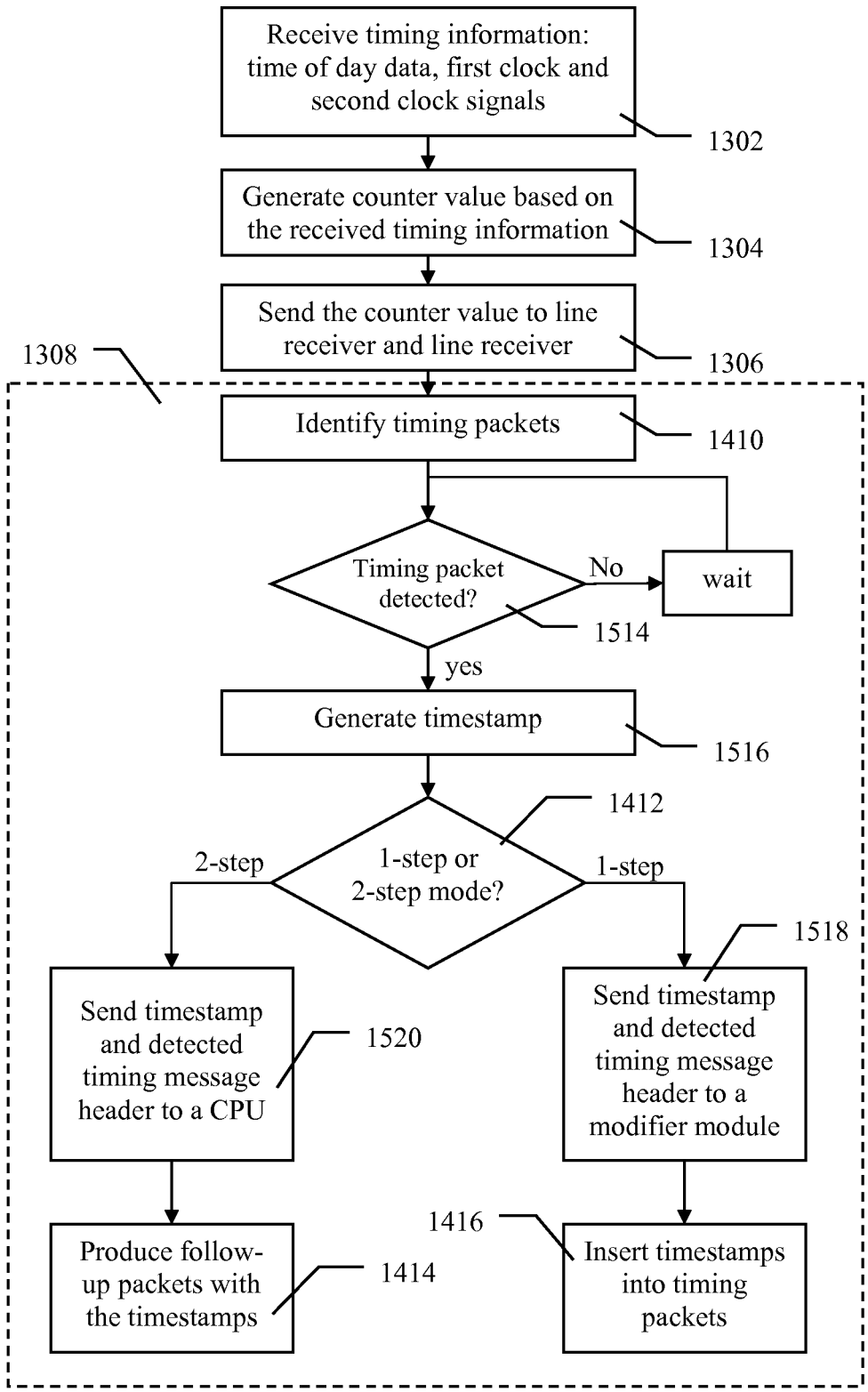

FIG. 15 depicts yet another embodiment of the method of synchronising time in a pluggable transceiver module 200. In this embodiment detection of a timing packet 1514 triggers generating of a timestamp 1516 based on the received counter values and sending said timestamp and message header information 1518 of the identified timing packet to a modifier module. In one embodiment generating a timestamp means that in the stream of counter values a counter value current at the time of the trigger is selected. In other word, the trigger (detection of a timing packet) causes making a snapshot of the rolling values of the counter and the value of the counter captured by the snapshot is the timestamp. If the method operates in 1-step mode the embodiment of the method further comprises updating 1416 at the modifier module the timing packet based on the received message header information and using the received timestamp.

Alternatively, in the 2-step mode the method comprises sending 1520 said timestamp and message header information of the identified timing packet to a processor unit which generates 1414 the follow-up message based on the message header information and the timestamp.

Figure 16:
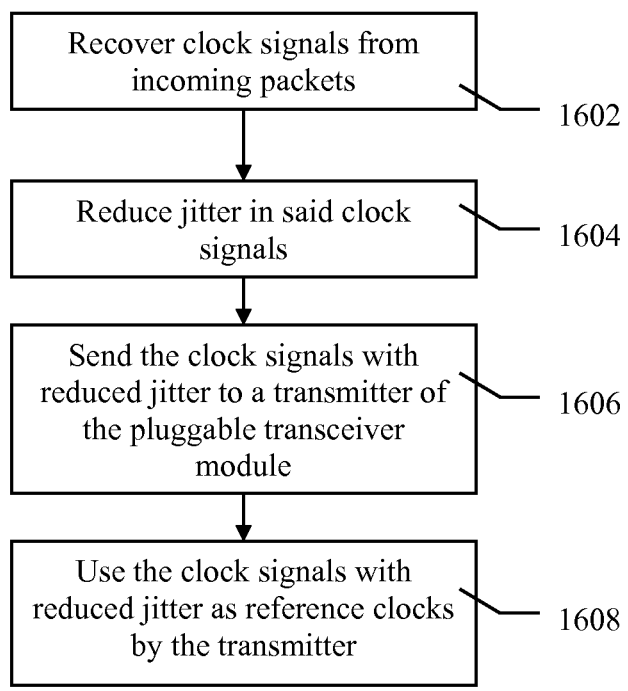
FIG. 16 illustrates a method of recovering Synchronous Ethernet timing in a pluggable transceiver module in one embodiment of the present invention.

FIG. 16 illustrates an embodiment of a method of recovering Synchronous Ethernet timing in a pluggable transceiver module 400. The method comprises recovering 1602 clock signals from incoming packets in a receiver of the pluggable transceiver module 400 and reducing 1604 jitter in said clock signals. The clock signals are then sent 1606 with reduced jitter to a transmitter of the pluggable transceiver module 400. The transmitter uses 1608 the clock signals with reduced jitter as the reference clocks for Synchronous Ethernet packet transmission.

The invention claimed is:

1. A pluggable transceiver module comprising:
   a line receiver connected to a unit interface transmitter;
   a line transmitter connected to a unit interface receiver;
   a timestamp counter adapted to generate counter values based on clock signals received from an external source and to send the counter values to the line transmitter and to the line receiver, wherein the external source of the clock signals is external to the pluggable transceiver and internal to a node on which the pluggable transceiver is installed, wherein the line transmitter and the line receiver are adapted to associate timing packets in a stream of data packets transmitted and received by the pluggable transceiver module with the counter values generated by the timestamp counter.

2. A pluggable transceiver module according to claim 1, further comprising:
   a non-volatile memory adapted to receive time of day information from an other external source; wherein
   the timestamp counter further comprising:
      a first input for receiving data representative of the time of day information from the non-volatile memory;
      a second input for receiving a first clock signal;
      a third input for receiving a second clock signal, wherein the first clock signal and second clock signal comprise the clock signals received from the external source, wherein the timestamp counter is adapted to generate the counter values by using the first clock signal to generate one or more of the counter values and using the second clock signal to trigger alignment of the one or more of the counter values with the data representative of the time of day information received from the non-volatile memory.

3. The pluggable transceiver module according to claim 2, wherein the first clock signal is a 125 MHz clock signal.

4. The pluggable transceiver module according to claim 2, wherein the second clock signal is a 1 Hz clock signal.

5. The pluggable transceiver module according to claim 2, wherein the first clock signal defines the speed at which the timestamp counter runs, whilst the second clock signal provides a phase of the timestamp counter to align beginning of each second with the beginning of a reference time.

6. The pluggable transceiver module according to claim 1, wherein the line transmitter comprises a first identifier module and a first modifier module, and the line receiver comprises a second identifier module and a second modifier module, wherein the first and second identifier modules are adapted to identify the timing packets and the first and second modifier modules are adapted to update the identified timing packets with timestamps based on information received from the timestamp counter.

7. The pluggable transceiver module according to claim 6, wherein the first identifier module comprises:
   a first detector module adapted to identify timing packets and to produce a trigger at detection of one of the identified timing packets;
   a first timestamp module adapted to generate a timestamp at said trigger from the first detector module and based on the information received from the timestamp counter;
   a first regulator module of the first detector module adapted to, at said trigger, obtain the timestamp from the first timestamp module and a message header information of the one of the identified timing packets and to send said timestamp and said header information to the first modifier module; and
   wherein the second identifier module comprises:
   a second detector module adapted to identify timing packets at the line receiver and to produce a trigger at detection of one of the identified timing packets;
   a second timestamp module adapted to generate a timestamp at said trigger from the second detector module and based on the information received from the timestamp counter;
   a second regulator module of the second detector module adapted to obtain, at said trigger, the timestamp from the second timestamp module and a message header information of the one of the identified timing packets and to send said timestamp and said header information to the second modifier module.

8. The pluggable transceiver module according to claim 7, wherein the first identifier module comprises a first handler module connected to the first timestamp module and the second identifier module comprises a second handler module connected to the second timestamp module, wherein the first handler module and the second handler module are both connected to the second modifier module.

9. The pluggable transceiver module according to claim 1, comprising a small form-factor pluggable, SFP, module.

10. A method of synchronising time in a pluggable transceiver module comprising:
generating in the pluggable transceiver module counter values based on timing signals received from an external source, wherein the external source of the timing signals is external to the pluggable transceiver module and internal to a node on which the pluggable transceiver module is installed;
sending the counter values to a line receiver and a line transmitter of the pluggable transceiver module;
associating timing packets received from and transmitted to a network with the generated counter values.

11. The method according to claim 10, wherein the timing signals include data representative of time of day information, a first clock signal defining the speed at which a timestamp counter runs and a second clock signal providing a phase of the timestamp counter to align beginning of each second with the beginning of a reference time.

12. The method according to claim 10, wherein the step of associating comprises:
identifying the timing packets in a stream of packets sent to and received from the network; and
associating the identified timing packets with timestamps based on the generated counter values.

13. The method according to claim 12, wherein the step of associating comprises updating the timing packets based on the generated counter values.

14. The method according to claim 13 wherein detection of a timing packet triggers:
generating a timestamp based on the generated counter values;
sending said timestamp and a message header information of one of the identified timing packets to a modifier module;
wherein the method further comprises updating at the modifier module the one of the identified timing packets based on the received message header information and using the received timestamp.

15. The method according to claim 12, wherein detection of a timing packet triggers:
generating a timestamp based on the generated counter values;
sending said timestamp and message header information of one of the identified timing packets to a processor unit;
generating a follow-up message based on the message header information and the timestamp.

* * * * *